United States Patent
Adragna

(10) Patent No.: US 8,451,629 B2
(45) Date of Patent: May 28, 2013

(54) INTEGRATED CIRCUIT FOR AN OSCILLATOR STRUCTURED TO DRIVE A CONTROL DEVICE OF A SWITCHING RESONANT CONVERTER

(75) Inventor: Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 315 days.

(21) Appl. No.: 12/979,214

(22) Filed: Dec. 27, 2010

(65) Prior Publication Data
US 2011/0157926 A1 Jun. 30, 2011

(30) Foreign Application Priority Data
Dec. 28, 2009 (IT) .............................. MI2009A2308

(51) Int. Cl.
*H02M 3/335* (2006.01)

(52) U.S. Cl.
USPC ....................................... 363/21.02; 323/288

(58) Field of Classification Search
USPC ............ 363/21.02, 21.03, 21.05, 21.09, 21.1, 363/21.11, 21.13, 21.17, 21.18, 97; 323/288
See application file for complete search history.

(56) References Cited

U.S. PATENT DOCUMENTS

| | | | |
|---|---|---|---|
| 4,694,383 A | 9/1987 | Nguyen et al. | |
| 5,552,979 A | 9/1996 | Gu et al. | |
| 6,744,649 B1 * | 6/2004 | Yang et al. | 363/98 |
| 8,115,466 B2 * | 2/2012 | Choi et al. | 323/285 |
| 8,217,323 B2 * | 7/2012 | Suenaga et al. | 219/715 |
| 2008/0019153 A1 | 1/2008 | Adragna et al. | |
| 2009/0196074 A1 | 8/2009 | Choi | |
| 2010/0202167 A1 * | 8/2010 | Yang | 363/26 |

FOREIGN PATENT DOCUMENTS

EP 0625820 A2 11/1994

OTHER PUBLICATIONS

Tang et al., "Charge Control: Modeling, Analysis and Design," Power Electronics Specialists Conference, 23rd Annual IEEE, vol. 1, pp. 503-511, 1992.
Tang et al., "Charge Control for Zero-Voltage-Switching Multi-Resonant Converter," Power Electronics Specialists Conference, 24th Annual IEEE, pp. 229-233, 1993.

* cited by examiner

*Primary Examiner* — Gary L Laxton
(74) *Attorney, Agent, or Firm* — Seed IP Law Group PLLC

(57) ABSTRACT

A circuit for an oscillator structured to drive a control device of a switching resonant converter; the converter having a switching circuit structured to drive a resonant load provided with at least one transformer with at least a primary winding and at least a secondary winding. The control device structured to drive the switching circuit, and the converter structured to convert an input signal into an output signal, the integrated circuit includes a first circuit structured to charge and discharge a capacitor by a first current signal such that the voltage at the ends of the capacitor is between first and second reference voltages, the current signal having a second current signal indicating the output voltage of the converter; the integrated circuit including a second circuit structured to rectify a signal indicating the current circulating in the primary winding.

15 Claims, 4 Drawing Sheets

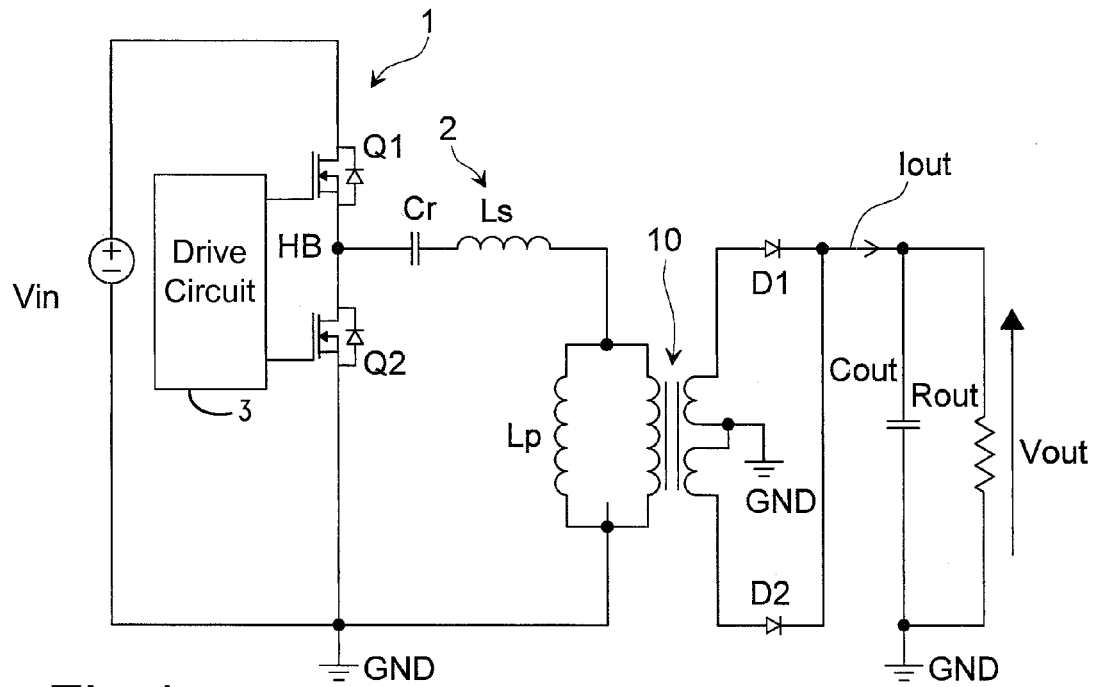
Fig. 1
*(Prior Art)*
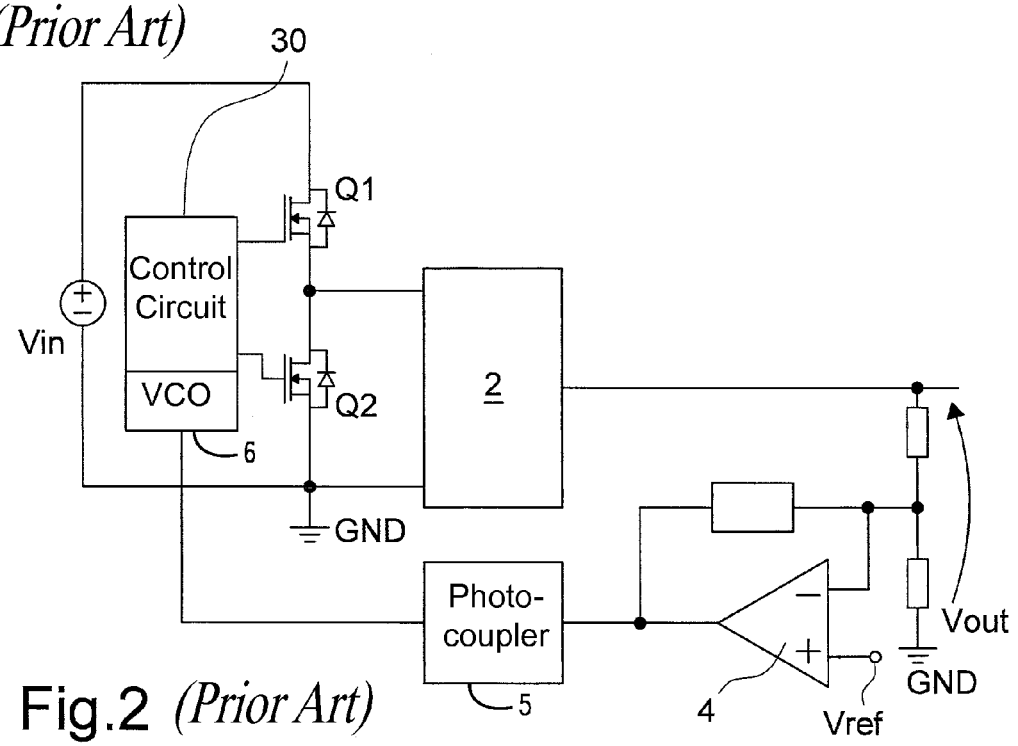
Fig. 2 *(Prior Art)*

INTEGRATED CIRCUIT FOR AN OSCILLATOR STRUCTURED TO DRIVE A CONTROL DEVICE OF A SWITCHING RESONANT CONVERTER

The present invention relates to an integrated circuit for an oscillator adapted to drive a control device of a switching resonant converter.

Forced switching converters (switching converters) with devices used for controlling them are known from the state of the art. Resonant converters are a wide range of forced switching converters characterized by the presence of a resonant circuit playing an active role in determining the input-output power flow. In these converters, a bridge (half bridge) consisting of four (two) power switches (typically power MOFSETs) supplied by a direct voltage generates a voltage square wave that is applied to a resonant circuit tuned to a frequency close to the fundamental frequency of said square wave. Thereby, because of the selective features thereof, the resonant circuit mainly responds to the fundamental component and negligibly to the higher-order harmonics of the square wave. As a result, the circulating power may be modulated by changing the frequency of the square wave, holding the duty cycle constant at 50%. Moreover, depending on the resonant circuit configuration, the currents and/or voltages associated with the power flow have a sinusoidal or a piece-wise sinusoidal shape.

These voltages are rectified and filtered so as to provide dc power to the load. In offline applications, to comply with safety regulations, the rectification and filtering system supplying the load is coupled to the resonant circuit by a transformer providing the isolation between source and load, required by the above-mentioned regulations. As in all isolated network converters, also in this case a distinction is made between a primary side (as related to the primary winding of the transformer) connected to the input source and a secondary side (as related to the secondary winding(s) of the transformer) providing power to the load through the rectification and filtering system.

Presently, among the many types of resonant converters, the so-called LLC resonant converter is widely used, especially in the half bridge version thereof. The designation LLC comes from the resonant circuit employing two inductors (L) and a capacitor (C); a principle schematic of an LLC resonant converter is shown in FIG. 1. The resonant converter 1 comprises a half bridge of transistors Q1 and Q2 between the input voltage Vin and the ground GND driven by a driving circuit 3. The common terminal HB between the transistors Q1 and Q2 is connected to a circuit block 2 comprising a series of a capacitor Cr, an inductance Ls and another inductance Lp connected in parallel to a transformer 10 with a center-tap secondary. The two windings of the center-tap secondary of transformer 10 are connected to the anodes of two diodes D1 and D2 the cathodes of which are both connected to the parallel of a capacitor Cout and a resistance Rout; the voltage across the parallel Rout, Cout is the output voltage Vout of the resonant converter, while the dc output current Iout flows through Rout.

Resonant converters offer considerable advantages as compared to the traditional switching converters (non-resonant converters, typically PWM—Pulse Width Modulation—controlled): waveforms without steep edges, low switching losses in the power switches due to the "soft" switching thereof, high conversion efficiency (>95% is easily reachable), ability to operate at high frequencies, low EMI (Electro Magnetic Interference) generation and, ultimately, high power density (i.e. enabling to build conversion systems capable of handling considerable power levels in a relatively small space).

As in most dc-dc converters, a closed-loop, negative-feedback control system keeps the output voltage of the converter constant upon changing the operating conditions, i.e. the input voltage Vin and/or the output current Iout thereof. This is achieved by comparing a portion of the output voltage to a reference voltage Vref. The difference, or error signal Er, between the value provided by the output voltage sensing system (usually, a resistor divider) and the reference value is amplified by an error amplifier. Its output Vc modifies a quantity x inside the converter which the energy carried by the converter during each switching cycle substantially depends on. As discussed above, such a significant quantity in resonant converters is the switching frequency of the square wave stimulating the resonant circuit.

As in all control systems in dc-dc converters, the frequency response of the error amplifier should be properly designed so as to ensure:

a stable control loop (i.e. that, upon disturbances of the operating conditions of the converter, once the transient caused by the disturbance has finished, the output voltage tends to recover a steady state value close to that before the disturbance;

good regulation (i.e. the new constant value recovered by the output voltage following a disturbance is very close to that preceding the perturbation);

good dynamic performance (i.e. during the transient following a disturbance, the output voltage does not excessively deviate from the desired value and the transient itself is short).

The above-mentioned control objectives may be expressed in terms of some characteristic quantities of the transfer function of the control loop, such as the band width, the phase margin, the dc gain. In a dc-dc converter, these objectives may be achieved by acting on the frequency response of the error amplifier, modifying the gain thereof and conveniently placing the poles and zeroes of the transfer function thereof (frequency compensation). This is normally achieved by using passive networks comprising resistances and capacitors of appropriate value connected thereto.

However, in order to determine the frequency compensation needed to obtain the desired features of the transfer function of the control loop, it is necessary to know both the modulator gain, i.e. the gain of the system converting the control voltage Vc into the control quantity x, and the frequency response of the converter itself to the variations of the quantity x.

The modulator gain does not usually depend on the frequency, and is fixed inside the control integrated circuit.

Although dc-dc converters are strongly non-linear system just because of the switching action, with suitable approximations and under certain hypothesis, their frequency response may be described and represented by the same means used for linear networks and, therefore, by a transfer function characterized by gain, zeroes and poles. This transfer function essentially depends on the converter topology, i.e. the mutual configuration of the elements handling the power, on its operation mode, i.e. whether, at every switching cycle, there is a continuous current circulation in the magnetic part (Continuous Current Mode, CCM) or not (Discontinuous Current Mode, DCM), and on the quantity x controlled by the control loop. While in PWM converters different control methods are commonly used—traditionally, in resonant converters, the quantity used to control the converter is directly the switching frequency of the square wave applied to the resonant circuit.

In all integrated control circuits for dc-dc resonant converters available in the market, the control directly operates on the oscillation frequency of the half bridge (Direct Frequency Control, DFC). FIG. 2 shows a control system for this type of resonant converters. The output of the error amplifier 4 on the secondary side, having a part of the output voltage Vout at the input of the inverting terminal and a reference voltage Vref on the non-inverting terminal, is transferred to the primary side by a photocoupler 5 so as to ensure the primary-secondary isolation required by the safety regulations, and acts upon a voltage-controlled oscillator (VCO) 6 or a current-controlled oscillator (ICO) inside the control integrated circuit 30.

This type of control arises two classes of problems. A first one relates to the fact that, unlike PWM converters, dynamic small-signal models for resonant converters expressed in terms of gain, poles and zeroes are not known in the literature (there are some approximated forms of questionable practical use). In other words, the transfer function of the power stage is not known. A second class of problems relates to the fact that, according to study results based on simulations, said transfer function of the power stage shows a strongly variable dc gain, and a number of poles varying from one to three and with a very mobile position, depending on the operating point. There is finally a zero due to the output capacitor.

The large gain variation and the highly variable pole configuration make the frequency compensation of the feedback control loop quite problematic. As a result, it is virtually impossible to obtain a transient response optimized under all the operating conditions, and a considerable trade-off between stability and dynamic performance is required. Additionally, the energy transfer strongly depends on the input voltage (audio-susceptibility), so that the control loop has to significantly change the operating frequency to compensate said variations. Since in the input voltage of the converter there is always an alternating component with a frequency twice that of the mains voltage, the loop gain at that frequency needs to be quite high to effectively reject said alternating component and significantly attenuate the residual ripple visible in the output voltage.

All these factors risk to rise problems which may be not all solvable, especially when the load supplied by the converter has great dynamic changes and/or there are strict specifications on the dynamic accuracy or the response speed or the rejection of the input ripple.

Finally, another problem related to the DFC control method is the sensitivity of the switching frequency to the value of the components in the resonant circuit (Cr, Ls and Lp). These values have a statistical spread due to their fabrication tolerances and this adversely affects the effectiveness of the protection circuits. In fact, generally speaking, to avoid that a converter may be operated abnormally, the control quantity x should be limited. In the case of resonant converters, the resonant controllers implementing DFC allow the operating frequency of the half bridge to be top and bottom limited. These limits should be set considering that, due to the above-mentioned value spread, the operating frequency range of the converter will change accordingly. The minimum limit set to the frequency should thus be lower than the minimum value which may be taken by the lower end of said range, and the maximum limit higher than the maximum value which may be taken by the higher end of said range. This significantly reduces the effectiveness of the frequency limitation as a means for preventing abnormal operational conditions.

A response to said problems consists of using a converter control based on a charge-mode control (CMC); said method has been described for the first time in the article "Charge Control: Analysis, Modeling and Design" to W. Tang, F. C. Lee, R. B. Ridley and I. Cohen, presented at the Power Electronics Specialists Conference, 1992. PESC '92 Record., 23rd Annual IEEE 29 Jun.-3 Jul. 1992 Page(s): 503-511 vol. 1. The idea of applying it to the resonant converters, instead, dates back to the article "Charge control for zero-voltage-switching multi-resonant converter" to W. Tang, C. S. Leu and F. C. Lee, presented at the Power Electronics Specialists Conference, 1993. PESC '93 Record., 24th Annual IEEE 20-24 Jun. 1993 Pages: 229-233.

In the first article, a small signal analysis shows that the dynamics of a CMC-controlled converter is similar to that of a peak current mode-controlled system, i.e. with a single, low-frequency pole and a pair of complex conjugate poles at half the switching frequency. Unlike peak current mode, where the damping factor of said pair of poles depends only on the duty cycle (this is connected to the well known sub-harmonic instability, when this is higher than 50%), with CMC control such damping factor depends also on the storage inductance of the converter and on the load. The sub-harmonic instability problem is more complex to be analyzed. As a trend, the instability tends to occur for low values of the input current and, therefore, of the load of the converter. In both methods, however, adding a compensation ramp to the ramp of the current (or the integral thereof in case of CMC), solves the problem. Moreover, the integration process makes the CMC method more noise insensitive than peak current mode.

In the second article (by Tang et al), a control device of the CMC type is disclosed. It is adapted to a resonant forward topology and realized in a discrete form: the current passing through the primary power circuit is directly integrated by using a current transformer with two output windings and two separate rectification systems for charging two series-connected integrating capacitors. This system is not well suited to be integrated; furthermore, current sensing systems with transformers are used in high power conversion systems and not in low power systems for cost reasons.

In view of the state of the art, it is an object of the present invention to provide an integrated circuit for an oscillator adapted to drive a control device of a switching resonant converter being able to realize CMC in a way different from those of the prior art.

In accordance with the present invention, said object is achieved by an integrated circuit for an oscillator adapted to drive a control device of a switching resonant converter, said converter comprising a switching circuit adapted to drive a resonant load, said resonant load comprising at least one transformer with at least a primary winding and at least a secondary winding, said control device being adapted to drive said switching circuit, said converter being adapted to convert an input signal into an output signal, said integrated circuit comprising first means adapted to charge and discharge a capacitor by a first current signal such that the voltage at the terminals of said capacitor is between first and second reference voltages, with said second reference voltage higher than said first reference voltage, said current signal comprising a second current signal representative of the feedback loop that controls the output signal of the converter, characterized in that it comprises second means adapted to rectify a signal representative of the current circulating in the primary winding, said first current signal comprising a third current signal proportional to the rectified signal.

In accordance with the present invention an oscillator comprising said integrated circuit and the capacitor external to the integrated circuit may also be provided.

Again in accordance with the present invention, a control device for resonant converters comprising the aforesaid integrated circuit may also be provided.

By virtue of the present invention, a control device for resonant converters may be provided, which allows the dynamic order of the converter to be reduced, by possibly making it equivalent to a single-pole system (at least in the frequency range relevant to the design of the frequency compensation), so as to improve its transient response to load variations.

Moreover, said control device reduces the audio-susceptibility of the converter, either through a reduced sensitivity to the variations of the input voltage and/or to the possibility of more freely setting the loop gain, so as to improve both the transient response to the variations of the input voltage, and the rejection of the input voltage ripple.

The features and advantages of the present invention will be apparent from the following detailed description of practical embodiments thereof, shown by way of non-limiting examples in the accompanying drawings, in which:

FIG. 1 shows a circuit schematic of a LLC resonant converter in accordance with the prior art;

FIG. 2 shows a block schematic of a resonant converter with adjustment of the output voltage in accordance with the prior art;

Figure 3:
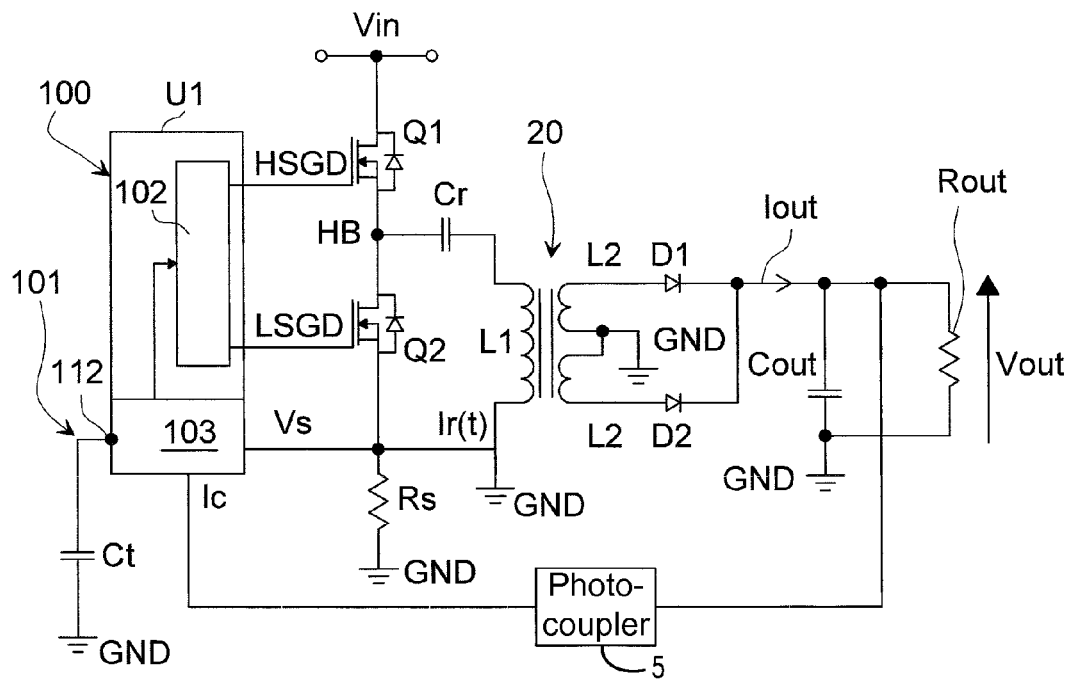
FIG. 3 shows a circuit schematic of a resonant converter with a control device comprising an oscillator in accordance with the present invention.

FIG. 3 shows a circuit schematic of a resonant converter with a control device 100 which comprises an oscillator 101 in accordance with the present invention. The converter comprises a resonant load preferably comprising a transformer 20 with a primary winding L1 and a secondary with two windings L2; the primary winding L1 is connected to the central point HB of the half bridge and in common between the transistors Q1 and Q2 by means of a capacitor Cr and it is directly connected to a sense resistor Rs connected to ground GND. The two windings L2 of the secondary are connected between ground GND and two respective diodes D1 and D2 having the cathodes in common and connected to the parallel of a resistance Rout and a capacitor Cout which is connected to ground GND. Transistors Q1 and Q2 are preferably MOS transistors, particularly NMOS transistors; the drain terminal of the transistor Q2 is in common with the source terminal of transistor Q1 and is the central point HB of the half bridge. The resonant current $i_R(t)$ passes through the primary winding L1.

FIG. 3 shows the current sensing element in the switching circuit Q1-Q2 represented by the resistor Rs placed in series to the resonant circuit Cr, 20, in particular connected to the primary winding L1 of transformer 20 and the ground GND, whereby at the terminals thereof there will be a voltage proportional to the resonant current $i_R(t)$ passing through the resonant circuit. This is a non-limiting example only: the sensing may also be carried out in other ways of the prior art (through a capacitive or resistive divider, with a current transformer, Hall sensor, etc.) providing a voltage signal accurately representative of the instantaneous current passing through the switching circuit.

The resonant current has zero average value (due to the presence of the capacitor connected in series) and, therefore, has both positive and negative values. The voltage signal Vs which is brought to the input of the control device will then have positive and negative values. The circuits connected at this input should at least tolerate negative voltages with respect to the ground (normally lower, as an absolute value, than 1 V) without leading to malfunctions.

The control device 100 comprises an oscillator 101 and a logic block 102 receiving the signal Vct at the output of the oscillator 101, i.e. the signal between the terminals of a capacitor Ct, and processes the signals HSGD and LSGD for driving the transistors Q1 and Q2 which may take a logic high value or a logic low value.

The oscillator 101 comprises an integrated circuit 103, constructed in a semiconductor chip, and the external capacitor Ct arranged between the pin 112 of the integrated circuit 103 and ground GND. However, even if not shown in the drawings, the capacitor Ct may be inside the integrated circuit 103.

The integrated circuit 103 of the oscillator 101 also has at the input the voltage signal Vs and the current Ic provided by block 5 representing a feedback loop of the output voltage Vout; the current Ic is a control signal and is representative of the feedback loop controlling the output voltage Vout, preferably the signal Ic is a function of the output current Iout and/or the input voltage Vin of the converter.

The integrated circuit 103 belongs to an integrated device U1 also comprising the logic block 102 and forming the control device 100 of the half bridge Q1-Q2 of the resonant converter.

Figure 4:
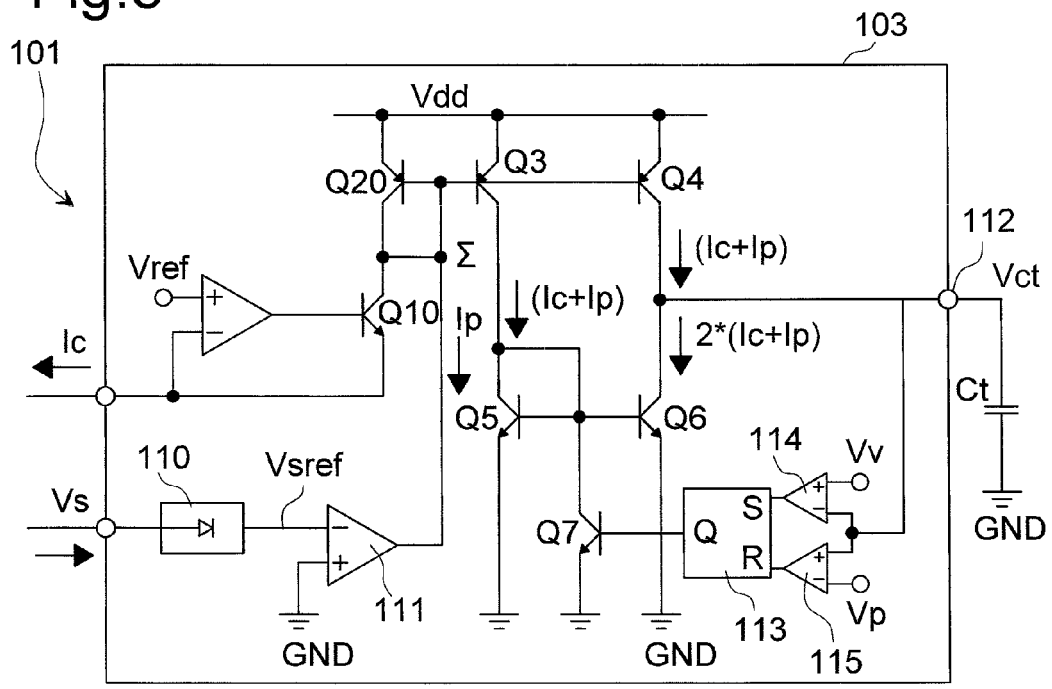
FIG. 4 shows a circuit schematic of an oscillator for a control device of a resonant converter in accordance with the first embodiment of the present invention.

FIG. 4 shows an oscillator 101 for a control device 100 of a switching resonant converter in accordance with the first embodiment of the present invention. The integrated circuit 103 comprises an ideal full-wave rectifier 110 receiving at the input thereof the voltage Vs proportional to the resonant current $i_R(t)$. The output signal Vsref of said rectifier is brought to the input of a voltage-current converter, a transconductance amplifier 111 of gain $g_m$ operating as a current sink and, therefore, absorbing a current $i_P(t)$ from the node Σ. Such a current will be given by:

$$i_P(t) = g_m \cdot Rs \cdot |i_R(t)|.$$

As mentioned, the current output $i_P(t)$ of the transconductance amplifier is connected to the input node E of the current mirror consisting of bipolar transistors Q20, Q3 and Q4 (in particular bipolar transistors of the pnp type), to which the collector terminal of the bipolar transistor Q10 is also coupled, carrying the current Ic representative of the feedback loop of the output voltage Vout. The external input from which the control current Ic is taken out acts as a voltage generator Vref capable of sourcing current.

The transistor Q3 mirrors the current Ic+$i_P(t)$ towards the other mirror consisting of the bipolar transistors Q5 and Q6 (in particular bipolar transistors of the npn type), while transistor Q4 outputs the current Ic+$i_P(t)$ towards the node 112 to which the capacitor Ct having the other terminal connected to the ground GND is connected; capacitor Ct is outside the integrated device U1. Transistor Q6 mirrors the current Ic+$i_P$(t) multiplying it by a factor 2 from the node Ct towards ground GND. Transistors Q20, Q3 and Q4 are preferably bipolar pnp transistors (but they could be p-channel MOS transistors) having the emitter terminals connected to a supply voltage Vdd; transistors Q5 and Q6 are preferably bipolar npn transistors (but they could be n-channel MOS transistors) having the emitter terminals connected to ground GND. The collector terminals of the transistors Q3-Q6 are in common.

A set-reset flip-flop 113 is provided, the set signal S of which is the output signal of a comparator 114 adapted to compare the voltage Vct at the terminals of capacitor Ct to the voltage Vv, while the reset signal R is the output signal of a comparator 115 adapted to compare the voltage Vct at the terminals of capacitor Ct to the voltage Vp, with Vp>Vv. The signal Q at the output of the flip-flop 113 drives the base of a terminal of a common-emitter bipolar transistor Q7 having the collector terminal connected to the common terminal of base and collector terminals of the transistor Q5 and collector terminal of the transistor Q3, and the emitter terminal connected to ground GND.

Initially, the voltage across the external capacitor Ct is zero. Therefore, the comparator 114 sets the SR flip-flop 113, the output Q of which becomes 1. Transistor Q7 is switched on and the mirror Q5, Q6 is switched off as the voltage of the base terminal of transistor Q5 is substantially zero. The capacitor Ct is then charged with the current Ic+$i_P$(t).

As soon as the voltage Vct reaches the voltage Vp, comparator 115 resets the SR flip-flop 113, the output Q of which goes to zero. The mirror formed by the transistors Q5, Q6 switches on and brings a current of 2 (Ic+$i_P$(t)) to ground GND, whereby the capacitor Ct discharges with a current equal to −[Ic+$i_P$(t)]. The discharge continues as long as the voltage on Ct reaches the value Vv, when the comparator 114 sets the SR flip-flop 113 again, switching off the mirror Q5, Q6. Capacitor Ct is charged again with a current Ic+$i_P$(t) and a new cycle starts. Since the capacitor Ct, is charged and discharged by currents having on average the same amplitude, its voltage will oscillate with a symmetrical waveform having a repetition period $T_{sw}$ related to capacitor Ct and currents±[Ic+$i_P$(t)].

Figure 5:
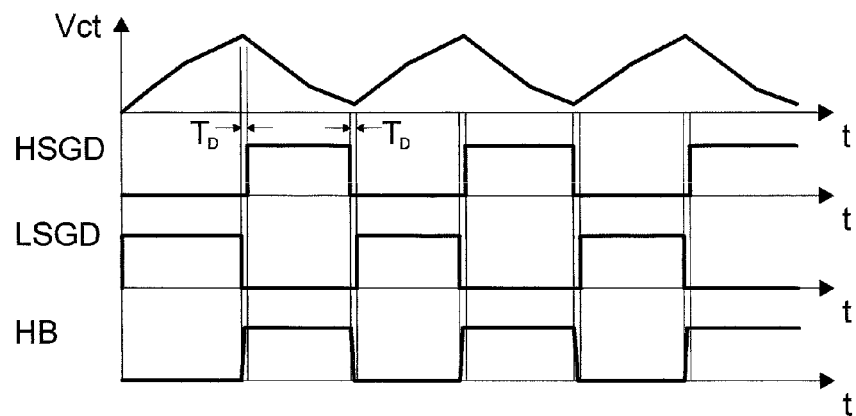
FIG. 5 shows some time diagrams of the signals involved in the device of FIG. 4.

If the switching operations of the half bridge Q1-Q2 of FIG. 3 are driven by the oscillator so implemented, for example according to the diagram shown in the time diagram of FIG. 5, the time period $T_{sw}$ will also be the switching period of said half bridge and, therefore, $f_{sw}=1/T_{sw}$ the switching frequency of the converter.

The equation describing the charge of Ct in a half switching period, denoting with Vv (for example equal to 1V) the valley voltage of the waveform on the capacitor Ct, and with Vp (for example equal to 4V) the peak voltage of said waveform, can be written as follows:

$$Vp = Vv + \frac{1}{Ct}\int_0^{\frac{T_{sw}}{2}} [Ic + i_P(t)]dt,$$

and considering that $i_P(t)=g_m \cdot Rs \cdot |i_R(t)|$ and that in the time period between 0 and $T_{sw}/2 |i_R(t)|=i_R(t)$, the result is:

$$Vp = Vv + \frac{1}{Ct}\left\{\frac{IcT_{sw}}{2} + g_m R_s \int_0^{\frac{T_{sw}}{2}} i_R(t)dt\right\}.$$

The average input current Iin is equal to the average value of the current of the resonant circuit during the period of conduction of the MOFSET transistor Q1, that is:

$$Iin = \frac{1}{T_{sw}} \int_0^{\frac{T_{sw}}{2}} i_R(t)dt.$$

Considering the above equation:

$$Vp = Vv + \frac{T_{sw}}{2Ct}(Ic + 2g_m Rs Iin),$$

i.e. $\Delta Vct = \frac{T_{sw}}{2Ct}(Ic + 2g_m Rs Iin),$ where ΔVct denotes the (internally fixed) width Vp-Vv.

Capacitor Ct is charged/discharged by a time-varying current; however, the quantity in round brackets represents the equivalent constant current that charges/discharges Ct from the bottom value to the peak value over a time equal to a half the switching period.

The average charge/discharge current of Ct is the sum of a component related to the control circuit, i.e. the current Ic, and a component proportional to the input current of the converter Iin. By said control device, the integration of the current of the resonant circuit is obtained, without the presence of negative voltages at the output of the integration block.

For high values of the current Iin, the current Ic is small; the component proportional to Iin is thus dominant, so as to obtain an operation very close to the pure CMC; as the current Iin is reduced, the associated current component becomes lower and lower and the current Ic higher and higher, therefore moving the operation more and more towards the DFC operation, consistently with the requirement for avoiding the subharmonic oscillation of the system.

The voltage oscillation across Ct, obtained with a charge current generator always on and a discharge generator of double value which is switched on during the discharge phase of Ct only, is merely exemplary: the same result could be obtained alternatively switching on and off charge and discharge generators having the same value.

FIG. 5 shows the time diagrams of the signals Vct, HSGD, LSGD and the voltage at the node HB. The time period Td is the time period of delay between the switching off of each of the two transistors Q1 or Q2 and the switching on of the complementary thereof.

Figure 6:
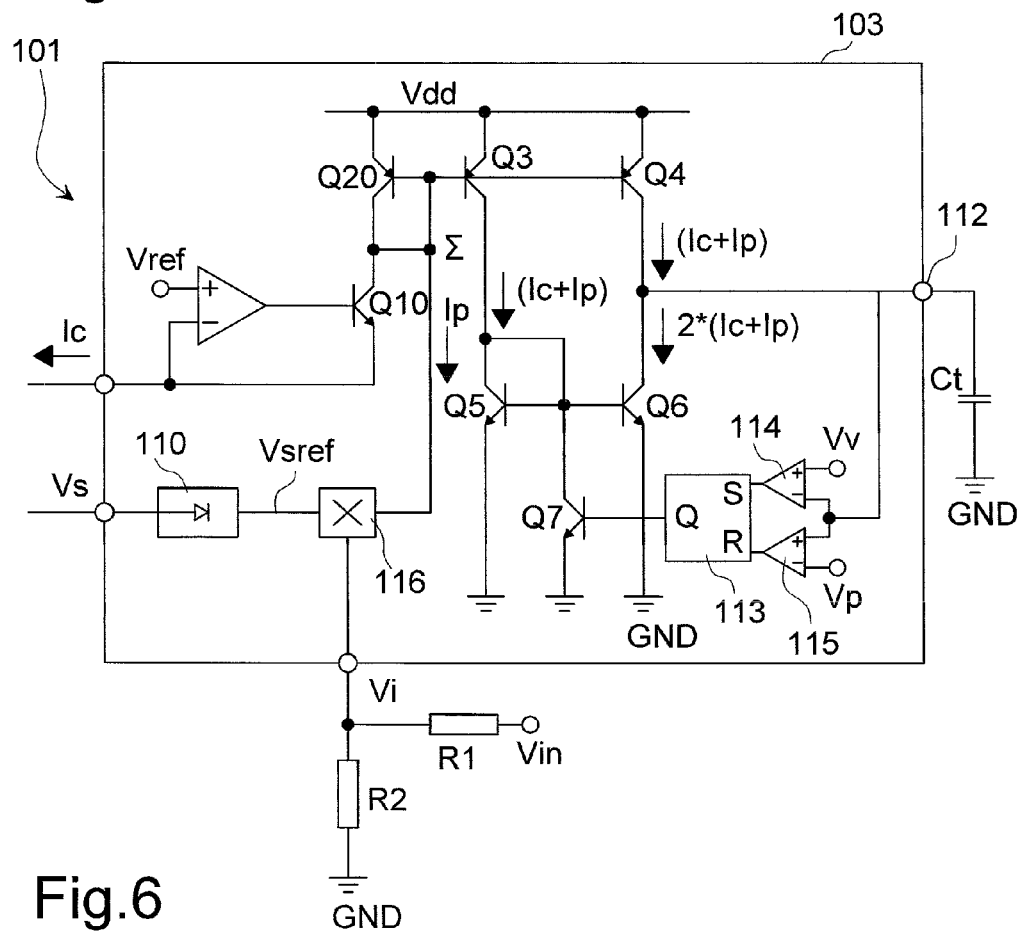
FIG. 6 shows a circuit schematic of an oscillator for a control device of a resonant converter in accordance with the second embodiment of the present invention.

FIG. 6 shows the oscillator 101 for a control device 100 of a switching resonant converter in accordance with the second embodiment of the present invention. The integrated circuit 103 of the second embodiment differs from the first embodiment due to the presence of an analog multiplier 116, for example constructed with a Gilbert cell, providing at the output a current $i_P$(t) proportional to the product of the voltage signals present at the inputs thereof, i.e. voltage Vsref, voltage Vs rectified by the rectifier 110, by a voltage V1 proportional to the input voltage Vin of the switching converter.

At the input on which the voltage V1 insists, a division of the direct input voltage of the converter Vin is applied through the resistances R1, R2. Indicating by Kin the division ratio of the input voltage, i.e.

$$Kin = \frac{R2}{R1 + R2},$$

and by Km the gain of the multiplier 116, the current $i_P$(t) will be given by:

$i_P(t)=Kin \cdot Km \cdot Rs \cdot Vin \cdot i_R(t).$

Replacing the value of $i_P(t)$ in the preceding equations and considering that the product Vin*Iin is the input power Pin, it is obtained:

$$Vp = Vv + \frac{T_{sw}}{2Ct}(Ic + 2Kin \cdot Km \cdot Rs \cdot Pin)$$

and $$\Delta Vct = \frac{T_{sw}}{2Ct}(Ic + 2Kin \cdot Km \cdot Rs \cdot Pin),$$

Therefore, the value of the feedback current Ic will be given by:

$$Ic = 2\left(\frac{Ct}{T_{sw}}\Delta Vct - Kin \cdot Km \cdot Rs \cdot Pin\right).$$

Therefore, the average charge/discharge current of capacitor Ct is the sum of a component related to the control circuit Ic and a component proportional to the converter input power Pin. Consistently with the requirement for the operation of the feedback circuit, for high values of power Pin, Ic is small; the component proportional to Pin is therefore dominant and the operation is very close to that of a pure power control device. As the power Pin is reduced, the associated current component becomes lower and lower and Ic higher and higher, consistently with the requirement for preventing the subharmonic oscillation of the system and moving the operation more and more towards a DFC. The key point is how to apportion the total charge/discharge current between the feedback component and that associated with the power so as not to have subharmonic oscillations in any case. The system simulations have shown that, if the maximum feedback current Ic (that associated with the conditions of minimum input voltage and maximum output load) is one third of the equivalent constant current which charges/discharges the capacitor Ct under the same operating conditions of input voltage and output load, subharmonic oscillations are not observed under any operating conditions.

Finally, it should be noted that the feedback current Ic does not exactly linearly depend on the power Pin due to the presence of the quantity $T_s$, which is also a function of the power Pin (the dependence would be exactly linear in a fixed frequency system, where $T_{sw}$ is constant). However, in LLC converters the switching frequency does not change much in a wide range of load conditions, if they work close to the resonance frequency of the resonant circuit. In such a range, with a good approximation the current Ic may be assumed to linearly depend on the power Pin.

Figure 7:
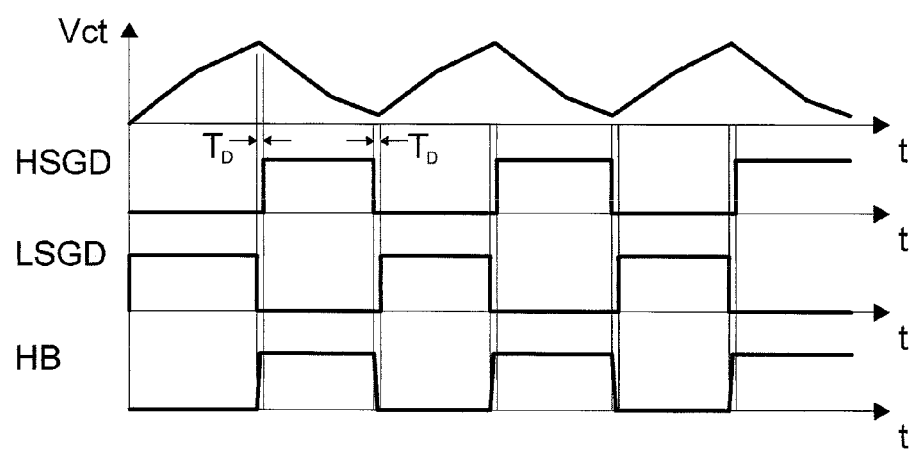
FIG. 7 shows some time diagrams of the signals involved in the device of FIG. 6.

FIG. 7 shows the time diagrams of the signals Vct, HSGD, LSGD and the voltage at the node HB. The time period Td is the time period of delay between the switching off operations of each of the two transistors Q1 or Q2 and the switching on of the complementary thereof.

The invention claimed is:

1. A circuit, comprising:
   a capacitor;
   a first circuit coupled to the capacitor and structured to charge and discharge the capacitor, the first circuit including a first current mirror structured to charge the capacitor, a second current mirror structured to discharge the capacitor, and first and second comparators structured to compare a voltage at the capacitor to first and second reference voltages, the first and second comparators having outputs coupled to set and reset inputs of a set-reset flip-flop, respectively, the flip-flop configured to output a control signal to a switch adapted to activate and deactivate a second current mirror in response to the output signal of the flip-flop and to charge the capacitor when activated; and
   a second circuit coupled to the first circuit, the second circuit including a rectifier circuit structured to rectify an input signal and to generate a rectified signal to the first current mirror.

2. The circuit of claim 1, wherein the second circuit includes a circuit structured to multiply the rectified signal.

3. The circuit of claim 1, comprising an oscillator adapted to drive a control device of a switching resonant converter, the converter including a switching circuit structured to drive a resonant load that includes at least one transformer with at least a primary winding and at least a secondary winding, the control device structured to drive the switching circuit and the resonant converter structured to convert an input signal into an output signal, the oscillator comprising an integrated circuit that includes the capacitor, the first circuit, and the second circuit.

4. The circuit of claim 3, comprising a photo coupler coupled to an output of the resonant converter to receive the output signal and to generate a corresponding signal that is received at the first circuit.

5. The circuit of claim 4, wherein the first circuit includes a comparator receiving on a first input terminal the corresponding signal from the photo coupler and on a second input terminal a voltage reference signal and outputting a comparison signal, the comparator circuit having an output coupled to the first current mirror to receive the comparison signal.

6. A system, comprising:
   a resonant converter having a control device that includes an oscillator and a logic block that receives an output signal of the oscillator coupled to a capacitor, the oscillator comprising an integrated circuit coupled to the capacitor, the integrated circuit including:
   a first circuit coupled to the capacitor and structured to charge and discharge the capacitor, the first circuit including a first current mirror structured to charge the capacitor, a second current mirror structured to discharge the capacitor, and first and second comparators structured to compare a voltage at the capacitor to first and second reference voltages, the first and second comparators having outputs coupled to set and reset inputs of a set-reset flip-flop, respectively, the flip-flop configured to generate an output signal that is configured to control a switch adapted to activate and deactivate a second current mirror in response to the output signal of the flip-flop and to charge the capacitor when activated; and
   a second circuit coupled to the first circuit, the second circuit including a rectifier circuit structured to rectify an input signal and to generate a rectified signal to the first current mirror.

7. The system of claim 6, wherein the second circuit includes a circuit structured to multiply the rectified signal.

8. The system of claim 6, comprising a feedback circuit having an input coupled to an output of the resonant converter and having an output coupled to an input of the integrated circuit to provide an isolated feedback signal to the integrated circuit.

9. The system of claim 8, wherein the feedback circuit comprises a photo coupler circuit.

10. The system of claim 7, further comprising a transconductance amplifier coupled to an output of the rectifier circuit and having an output coupled to the first current mirror in the first circuit.

11. An integrated circuit for an oscillator adapted to drive a control device of a switching resonant converter, the converter having a switching circuit adapted to drive a resonant load, the resonant load including at least one transformer with at least a primary winding and at least a secondary winding, the control device being adapted to drive the switching circuit, the converter being adapted to convert an input signal into an output signal, the integrated circuit comprising:
- a first circuit structured to charge and discharge a capacitor by a first current signal such that a voltage at the ends of the capacitor is between first and second reference voltages, with the second reference voltage higher than the first reference voltage, the first current signal including a second current signal indicating the output voltage of the converter; and
- a second circuit structured to rectify a signal indicating the current circulating in the primary winding and generate a rectified signal, the first current signal including a third current signal proportional to the rectified signal.

12. The integrated circuit according to claim 11, comprising a further circuit structured to multiply the rectified signal by a signal indicating the input voltage of the converter, and wherein the third current signal is the current signal at the output of the further circuit and the first current signal is the sum of the second and the third current signals.

13. The integrated circuit according to claim 11, wherein the first circuit comprise a first current mirror structured to charge the capacitor with the first current signal, a second current mirror structured to discharge the capacitor with a current substantially having a value equal to the first current signal, first and second comparators structured to compare the voltage at the ends of the capacitor to the first and second reference voltages, respectively, the outputs of the comparators comprising the set and reset inputs of a set-reset flip-flop, the output signal of which controls a switch structured to activate and deactivate the second current mirror in response to the signal at the output of the set-reset flip-flop.

14. The integrated circuit according to claim 11, wherein the capacitor is inside the integrated circuit.

15. The integrated circuit according to claim 11, wherein the capacitor is outside the integrated circuit.

* * * * *